US006007657A

United States Patent [19]

Eddy et al.

[11] Patent Number: 6,007,657

[45] Date of Patent: Dec. 28, 1999

[54] METHOD FOR INCREASING THERMAL CONDUCTIVITY OF FUSER MEMBER HAVING ELASTOMER AND ANISOTROPIC FILLER COATING

[75] Inventors: Clifford O. Eddy, Webster; Arnold W. Henry, Pittsford; James B. Maliborski, Rochester; Santokh S. Badesha, Pittsford, all of N.Y.

[73] Assignee: Xerox Corporation, Stamford, Conn.

[21] Appl. No.: 09/106,337

[22] Filed: Jun. 29, 1998

[51] Int. Cl.[6] .............................. B31C 13/00; F28F 5/02; B29C 3/02; G03G 15/20

[52] U.S. Cl. .................... 156/184; 156/256; 156/244.11; 492/46; 399/328; 399/330; 399/333

[58] Field of Search .................................... 156/184, 187, 156/244.11, 256, 250; 399/328, 330, 331, 333, 334; 428/906; 430/99; 492/46

[56] References Cited

U.S. PATENT DOCUMENTS

| | | | |
|---|---|---|---|
| 4,257,699 | 3/1981 | Lentz | 355/3 FU |
| 4,763,158 | 8/1988 | Schlueter, Jr. | 355/3 FU |
| 4,887,340 | 12/1989 | Kato et al. | 29/130 |
| 5,012,072 | 4/1991 | Martin et al. | 219/469 |
| 5,066,517 | 11/1991 | Hanson et al. | 427/197 |
| 5,123,151 | 6/1992 | Uehara et al. | 29/130 |
| 5,332,641 | 7/1994 | Finn et al. | 430/124 |
| 5,349,423 | 9/1994 | Nagato et al. | 355/285 |
| 5,458,954 | 10/1995 | Ogi et al. | 428/195 |
| 5,614,935 | 3/1997 | Ogi et al. | 347/213 |
| 5,631,043 | 5/1997 | Ogi et al. | 427/202 |
| 5,729,813 | 3/1998 | Eddy et al. | 399/333 |
| 5,744,241 | 4/1998 | Hobson et al. | 428/422 |
| 5,765,085 | 6/1998 | Law et al. | 399/329 |
| 5,773,796 | 6/1998 | Singer et al. | 219/470 |

*Primary Examiner*—Richard Crispino
*Assistant Examiner*—Sue A. Purvis
*Attorney, Agent, or Firm*—Annette L. Blade

[57] ABSTRACT

A method for increasing the thermal conductivity of a fuser member for use in electrostatographic, including digital, apparatuses, by orienting anisotropic fillers in an elastomer layer in a manner wherein heat transfer is maximized in a radial or tangential direction of the fuser member. The fuser member may also contain other optional fillers and optional fluorocarbon powder fillers.

32 Claims, 6 Drawing Sheets

METHOD FOR INCREASING THERMAL CONDUCTIVITY OF FUSER MEMBER HAVING ELASTOMER AND ANISOTROPIC FILLER COATING

BACKGROUND OF THE INVENTION

The present invention relates to a method of increasing thermal conductivity of a fuser member useful in fusing toner images in an electrostatographic reproducing, including digital, apparatus. The present invention further relates to a fuser member prepared by such a method, having increased thermal conductivity. More specifically, the present invention relates to methods for increasing thermal conductivity of a fuser member by orienting anisotropic fillers and optional other fillers such as fluorocarbon fillers or fluorocarbon liquids, in a manner which results in maximum heat transfer.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes it to be firmly bonded to the support.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The hot offset temperature or degradation of the hot offset temperature is a measure of the release property of the fuser, and accordingly it is desired to provide a fusing surface which has a low surface energy to provide the necessary release.

To ensure and maintain good release properties of the fuser, it has become customary to apply release agents to the fuser roll during the fusing operation. Typically, these materials are applied as thin films of, for example, silicone oils such as polydimethyl siloxane (PDMS), mercapto oils, amino oils, and other silicone oils to prevent toner offset. The fuser oils may contain functional groups or may be non-functional, or may be blends of functional and nonfunctional.

Fillers have been added to the outer layer of fuser members having elastomer layers in order to increase thermal conductivity thereof.

U.S. Pat. No. 5,464,698 discloses a fuser member having a layer including a cured fluorocarbon random copolymer having subunits of vinylidene fluoride, hexafluoropropylene and tetrafluoroethylene, and having tin oxide fillers in combination with alkali metal oxides and/or alkali metal hydroxide fillers incorporated into the fuser layer.

U.S. Pat. No. 5,292,606 discloses a fuser roll having a base cushion layer comprising a condensation-crosslinked polydimethylsiloxane elastomer and having zinc oxide particles dispersed therein.

U.S. Pat. No. 5,464,703 discloses a fuser member having a base cushion layer including a crosslinked poly (dimethylsiloxane-fluoroalkylsiloxane) elastomer having tin oxide particles dispersed therein.

U.S. Pat. No. 5,563,202 discloses a fuser member having a base cushion layer having a crosslinked poly (dimethylsiloxane-fluoroalkylsiloxane) elastomer having tin oxide particles dispersed therein.

U.S. Pat. No. 5,466,533 discloses a fuser member having an overlying layer comprising a crosslinked polydiphenylsiloxane-poly(dimethylsiloxane) elastomer having zinc oxide particles dispersed therein.

U.S. Pat. No. 5,474,852 discloses a fuser member having an overlying layer comprising a crosslinked polydiphenylsiloxane-poly(dimethylsiloxane) elastomer having tin oxide particles dispersed therein.

U.S. Pat. No. 5,480,724 discloses a fuser member having a base cushion layer comprising a condensation-crosslinked polydimethylsiloxane elastomer having tin oxide particles dispersed therein.

U.S. Pat. No. 5,547,759 discloses a fuser member having a release coating comprising an outermost layer of fluoropolymer resin bonded to a fluoroelastomer layer by means of a fluoropolymer-containing polyamide-imide primer layer. Also disclosed is use of zinc oxide.

U.S. Pat. No. 5,595,823 discloses a fuser member having a layer including a cured fluorocarbon random copolymer having subunits of vinylidene fluoride, hexafluoropropylene and tetrafluoroethylene and having aluminum oxide filler along with alkali metal oxides and/or alkali metal hydroxide fillers incorporated into the fuser member layer.

U.S. Pat. No. 5,587,245 discloses a fuser member having an outer layer of an addition crosslinked polyorganosiloxane elastomer and zinc oxide particles dispersed therein.

Fillers are added to outer fusing layers in order to increase the thermal conductivity so as to reduce the temperature needed to promote fusion of toner to paper and to save energy consumption. Efforts have been made to increase the thermal conductivity which will allow for increased speed of the fusing process by reducing the amount of time needed to sufficiently heat the fuser member to promote fusing. Efforts have also been made to increase toner release in order to prevent toner offset which may lead to inadequate copy quality, inferior marks on the copy, and toner contamination of other parts of the machine.

Therefore, it is desirable to provide a method for increasing the thermal conductivity of a fuser member. It is further desirable that such method also allows for production of a fuser member having a combination of outer layer and filler material which provides an increase in release and a decrease in the occurrence of toner offset. It is also desirable that such method allows for production of a fuser member having an outer layer which provides for an increase in the fusing speed at a set temperature, or in the alternative, allows for use of a reduced temperature at normal or standard fusing speeds. It is also desirable to that such method provides a fuser member having increased wear resistance, and increased fusing life.

SUMMARY OF THE INVENTION

In embodiments, the present invention relates to: a method for increasing thermal conductivity of a heated fuser member comprising orienting anisotropic fillers in an elastomer layer in a manner wherein heat transfer is maximized in a radial, tangential or both radial and tangential direction of said fuser member.

BRIEF DESCRIPTION OF THE DRAWINGS

For a better understanding of the present invention, reference may be had to the accompanying figures.

DETAILED DESCRIPTION OF THE PRESENT INVENTION

Figure 1:
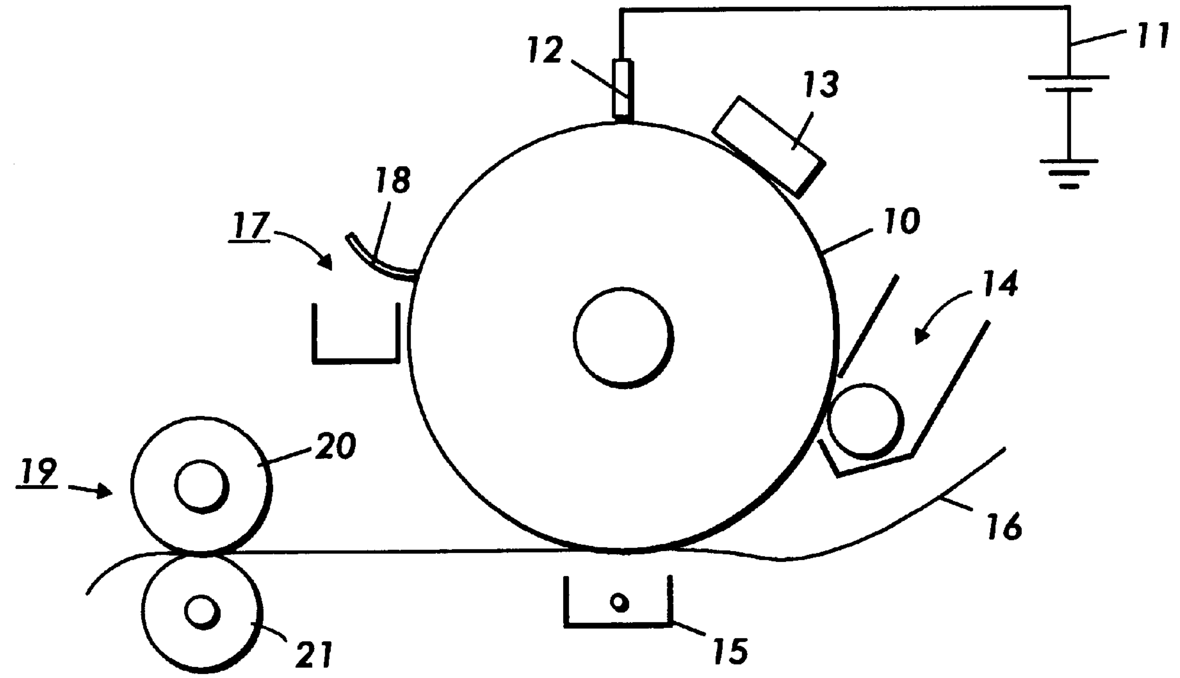
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 18 (as shown in FIG. 1), brush, or other cleaning apparatus.

Figure 2:
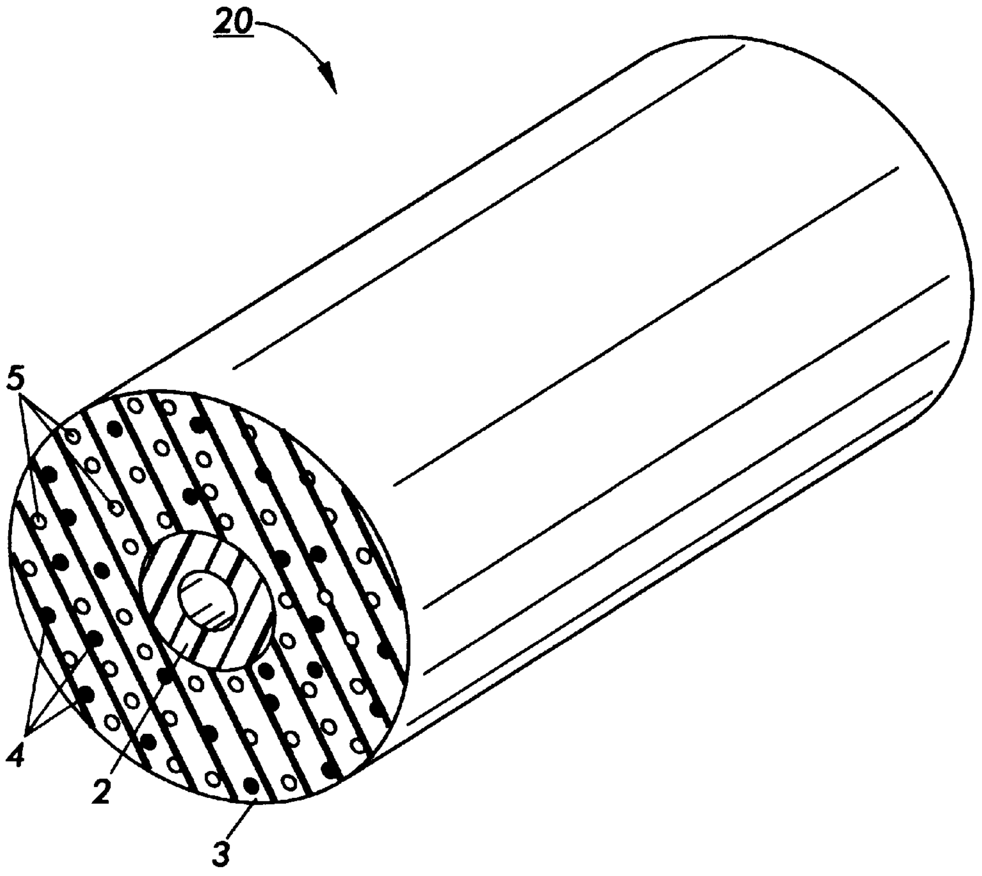
FIG. 2 illustrates a cross sectional view of a fusing roller in accordance with an embodiment of the present invention.

Referring to FIG. 2, an embodiment of a fusing station 19 is depicted with an embodiment of a fuser roll 20 comprising elastomer layer 3 with anisotropic filler 4 and optional fluorocarbon powder filler 5. The elastomer layer 3 is positioned upon a suitable base member 2, a hollow cylinder or core fabricated from any suitable metal, such as aluminum, anodized aluminum, steel, nickel, copper, and the like, having a suitable heating element (not shown) disposed in the hollow portion thereof which is coextensive with the cylinder. In another embodiment, the heater element can be located external to the fuser member, or in an optional embodiment, both external and internal heating elements can be used. The fuser member 20 can include an adhesive, cushion, or other suitable layer (not shown) positioned between core 2 and outer elastomer layer 3.

Figure 3:
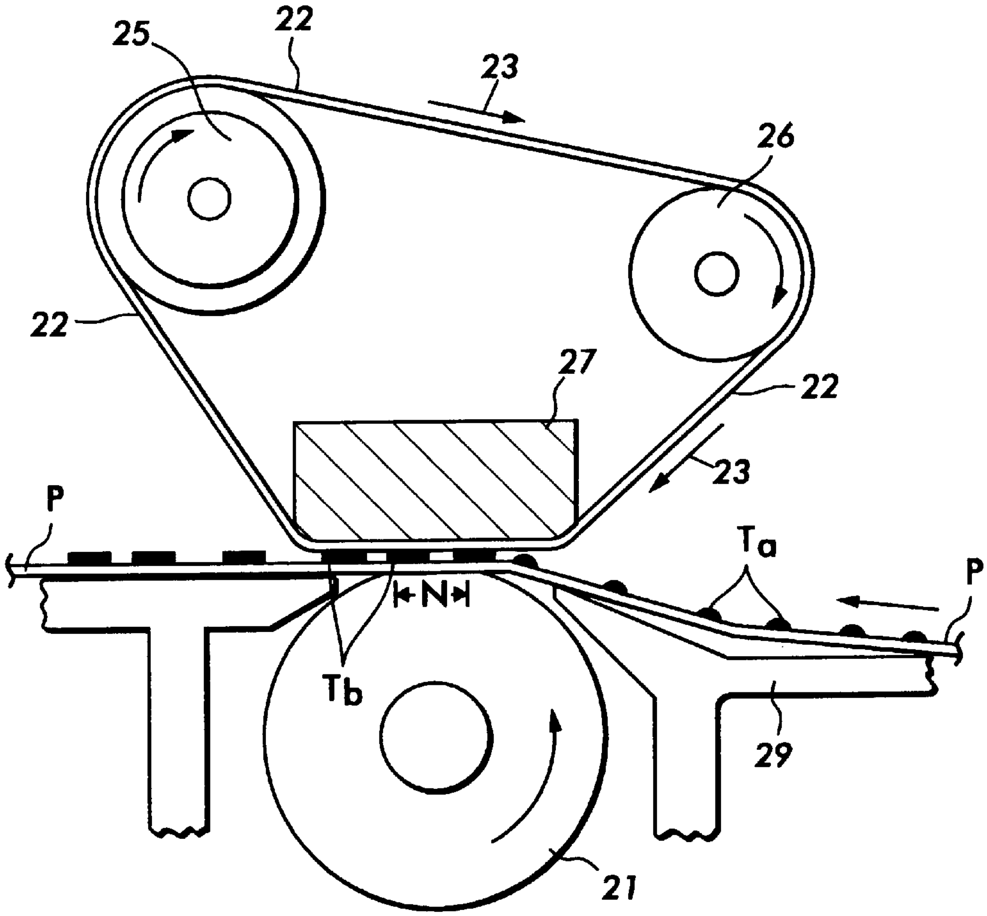
FIG. 3 illustrates a fusing system in accordance with an embodiment of the present invention depicting a fuser belt and pressure roller system.

FIG. 3 depicts another embodiment of the present invention and shows a fusing system using a fuser belt 22 and pressure roller 21. In FIG. 3, a heat resistive or stable film or an image fixing film 22 in the form of an endless belt is trained or contained around three parallel members, i.e., a driving roller 25, a follower roller 26 of metal and a low thermal capacity linear heater 27 disposed between the driving roller 25 and the follower roller 26.

The follower roller 26 also functions as a tension roller for the fixing film 22. The fixing film rotates at a predetermined peripheral speed in the clockwise direction by the clockwise rotation of the driving roller 25.

A pressing roller 21 has a rubber elastic layer with parting properties, such as silicone rubber or the like, and is press-contacted to the heater 22 with the bottom travel of the fixing film 22 therebetween.

Upon an image formation start signal, an unfixed toner image is formed on a recording material at the image forming station. The recording material sheet P having an unfixed toner image Ta thereon is guided by a guide 29 to enter between the fixing film 22 and the pressing roller 21 at the nip N (fixing nip) provided by the heater 27 and the pressing roller 21. Sheet P passes through the nip between the heater 27 and the pressing roller 21 together with the fixing film 22 without surface deviation, crease or lateral shifting while the toner image carrying surface is in contact with the bottom surface with the fixing film 22 moving at the same speed as sheet P. The toner image is heated at the nip so as to be softened and fused into a softened or fused image Tb.

In another embodiment of the invention, not shown in the figures, the fixing film may be in the form of a sheet. For example, a non-endless film may be rolled on a supply shaft and taken out to be wrapped on a take-up shaft through the nip between the heater and the pressing roller. Thus, the film may be fed from the supply shaft to the take-up shaft at the speed which is equal to the speed of the transfer material. This embodiment is described and shown in U.S. Pat. No. 5,157,446, the disclosure of which is hereby incorporated by reference in its entirety.

Figure 4:
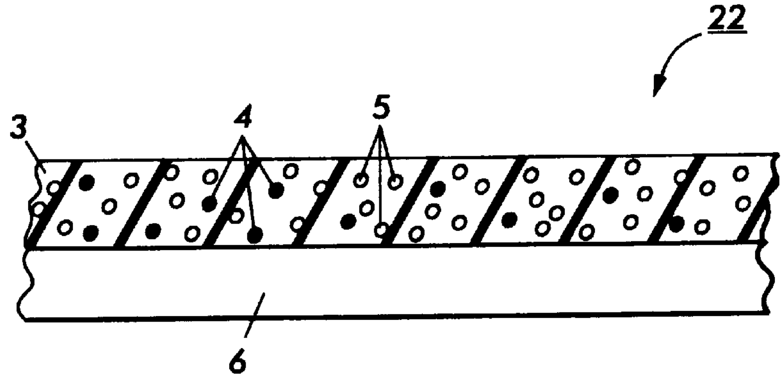
FIG. 4 depicts a cross sectional view of a fuser belt in accordance with an embodiment of the present invention.

FIG. 4 depicts a cross directional view of an embodiment of a fuser belt 22. FIG. 4 depicts fuser belt substrate 6 having thereon elastomer layer 3 with anisotropic filler 4 and optional fluorocarbon powder filler 5 dispersed or contained therein.

Figure 5:
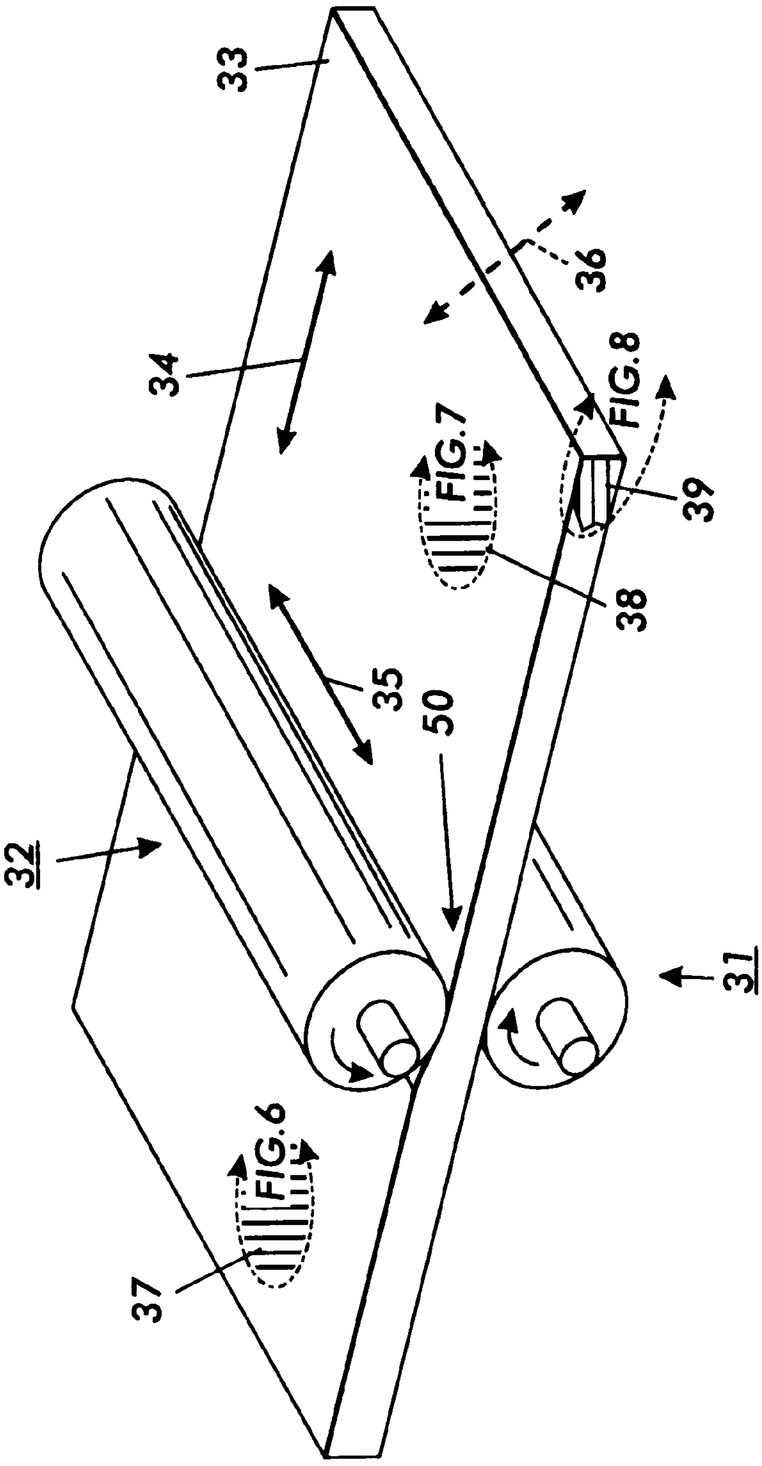
FIG. 5 is a schematic illustration of the preparation of an elastomer layer comprising fillers.

Layers for fuser members including elastomer layers, are currently processed by compounding the elastomer, fillers, and any additives in a two roll mill. An illustration of an embodiment of the process is shown in FIG. 5. A roll mill consists of a front roller 32 and a back roller 31. Compounding elastomers in this manner comprises first banding of the rubber without fillers or other additives on the mill by adding the elastomer by solid strips, lumps or the like into the nip 50 formed between the front roller 32 and back roller 31 in order to band the rubber on one of the rolls. A layer will thereby form on the front roller 32 as the front roller may be moving slightly faster than the back roller 31. As the two rollers turn, the elastomer will agglomerate between the two rollers at rolling nip 50 and some elastomer will remain adhered to the front roller 32. Subsequently, any fillers or other additives such as crosslinkers, accellerators and the like, are then added by pouring these additives on top of the rolling nip 50. These additives are drawn into the rolling nip and are thereby dispersed in the elastomer matrix. This is often known as dispersive mixing. Additional mixing, known as distributing mixing, is accomplished by making relatively small cuts in the elastomer layer which is attached to the front roller 32 and turning the layer back on itself as the rollers turn. This provides distribution of the dispersed material evenly in the body of the elastomer. Next, the elastomer is sheeted from the roller by making a cut completely across the front roller 32 in a cross machine direction 35, and pulling the elastomer through the nip. The cut elastomer is then molded onto a fuser member and cured by standard heat curing.

Figure 9:
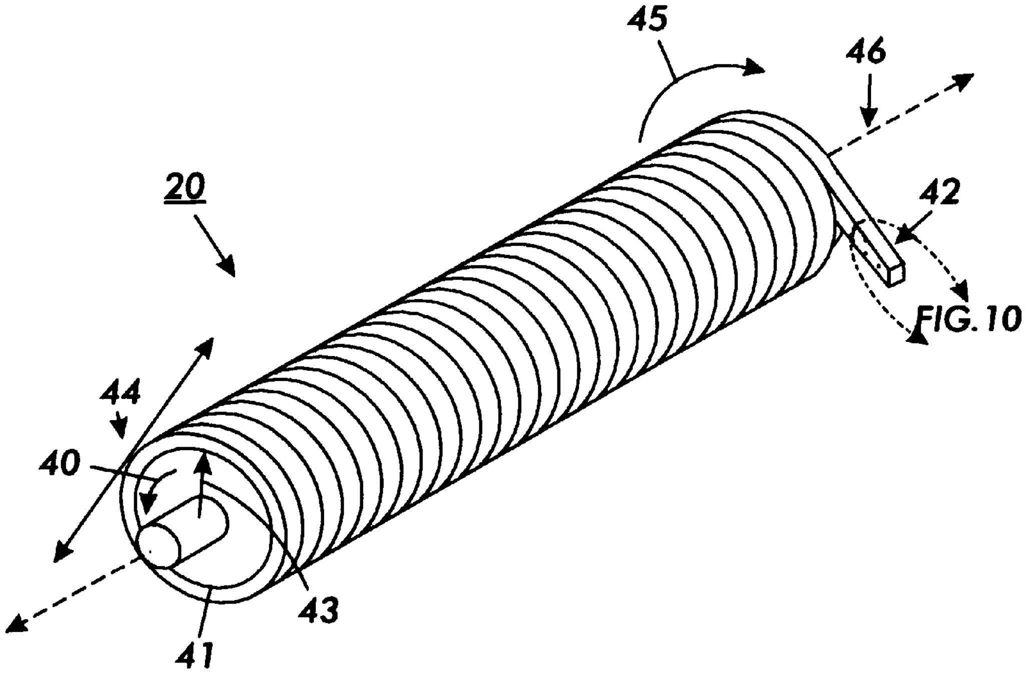
FIG. 9 is a schematic illustration of a method of making a fuser member by wrapping strips of the two roll milled elastomer onto a fuser member.

In the standard roll milling method, thermal conductivity is obtained by dispersion of the fillers in the elastomer in the machine direction 34 and cross machine direction 35 shown in FIG. 5. However, thermal conductivity is not enhanced sufficiently in the thickness direction 36. When the layer is positioned on a fuser member as shown in FIG. 9, improved conductivity is obtained in the longitudinal 46 direction and tangential 44 direction, but not radial 43 direction.

Figure 6:
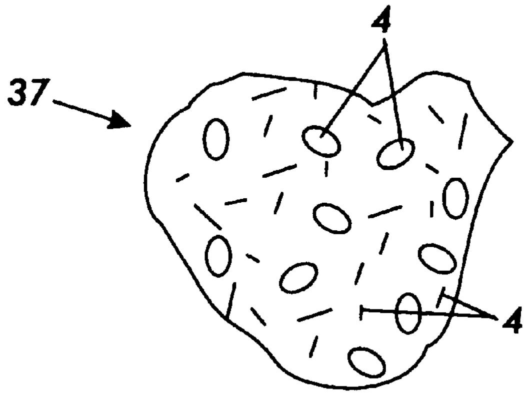
FIG. 6 is an enlargement of an embodiment of an elastomer layer showing the filler orientation prior to processing the elastomer through a two roll mill.
Figure 7:
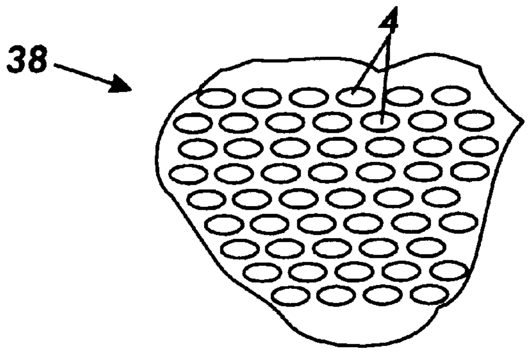
FIG. 7 is an enlargement of an elastomer layer showing the filler orientation after processing the elastomer through a two roll mill.

More specifically, as shown in enlargement 37 of FIGS. 5 and 6, fillers 4 are dispersed randomly in the elastomer 33 prior to entering the two roll mill. It should be appreciated that FIGS. 6–8 and 10 show orientations at extremes. It should further be appreciated that orientations other than these extremes will occur in practice. After the fillers are mixed in the two roll mill, the elastomer is pulled from the roll mill nip 50. The pressure of the front roller moving somewhat faster than the back roller coupled with the pulling action of the elastomer from the nip 50, flattens the fillers, thereby lining up the fillers 4 in the machine 34 and cross machine 35 direction as shown in enlargement 38 of FIGS. 5 and 7. Enlargement 39 of FIGS. 5 and 8 demonstrate the magnified side view demonstrating the filler orientation.

Figure 8:
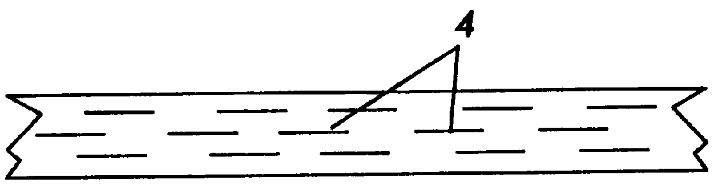
FIG. 8 is an enlargement of an embodiment of an elastomer layer showing the filler orientation in the thickness direction after processing the elastomer through a two roll mill.

The elastomer thus formed has thermal conductivity in the cross machine 35 and machine 34 directions, but not in the thickness 36 direction. When the layer is positioned on a fuser member, improved conductivity is obtained in the longitudinal 46 direction and tangential 44 direction, but not in the radial 43 direction of the fuser member. As shown in FIG. 8, the fillers 4 are spaced apart due to their platelike shape and orientation in the machine and cross machine direction. The enhanced spaces between the fillers does not provide thermal conductivity.

The present inventors have determined a method for enhancing thermal conductivity in the radial 43 and tangential 44 (or circumferential) directions of a fuser member, as opposed to the longitudinal 46 direction, by modifying the orientation of anisotropic fillers in an elastomer.

In place of roll milling as set forth above, the filled elastomer may be formed by placing the elastomer, fillers, and any other additives into an extruder. An extruder is a heated cylinder having a mixing screw inside the cylinder to push and mix materials and finally push the mixed elastomer compound through a slotted dye. Any known extruder can be used such as, for example, a Killion Rubber Extruder or Werner Pfleiderer. A preferred extruder comprises a twin screw mechanism. Examples of twin-screw extruders include those manufactured by Werner Pfleiderer.

An alternative method is to use the above roll milling steps, followed by an additional extruder step. The additional step includes feeding strips of the roll milled elastomer into an extruder. First, the roll milled elastomer is cut into strips for convenient feeding into an extruder. These strips may be of any size as long as they are small enough to fit into the throat of an extruder. The extruder mixes the elastomer into a long rectangular extrudate.

The formed extrudate can be coated onto fuser member by winding or wrapping the thin, elongated strip onto a fuser roller as the fuser roll turns. A demonstration of this method is shown in FIG. 9 wherein a fuser member 20 is formed by wrapping an extruded elastomer material 41 in a spiral motion in direction 45 around a fuser member core as the fuser member is rotated in direction 40. The coating will resemble barber pole striping as it winds around the fuser member. It is preferred that little or no spaces form between the strips of the elastomer as they are wound around the fuser member. The coated fuser member can then be coated with additional coatings or layers which can also contain oriented fillers as discussed above, and then compression molded at normal curing temperatures, for example from about 300 to about 375° F. for a time of from about 15 minutes to about one hour.

As an alternative to mixing the elastomer and additives in an extruder, the elastomer may be processed as discussed above in a two-roll mill process, the layer pulled from the nip of the roll mill, and then the layer cut into strips of from about a few centimeters (from about 1 to about 10 cm) to a few inches (from about 1 to about 10 inches) in width. These strips can then be wrapped around a fuser member in a spiral motion as shown in FIG. 9.

Figure 10:
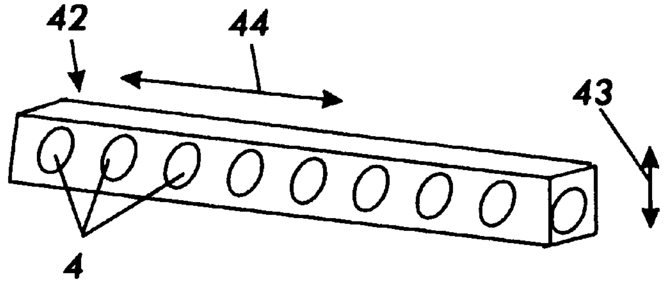
FIG. 10 is an enlargement of an embodiment of elastomer strips showing a preferred orientation of filler.

The resulting fuser member will contain an elastomer layer having improved thermal conductivity in the radial 43 direction, in addition to the tangential 44 (or cicumferential 40 or 45) direction. As shown in FIG. 10, the filler 4 is oriented in radial direction 43 so as to enhance both radial 43 and tangential 44 (or circumferential 40 or 45) thermal conductivity. Oriented in the radial direction as shown in FIG. 10, there is increased surface area of filler oriented in the direction which thermal conductivity flows. During normal fusing processes, heat flows from the core surface containing the internal heat source, to the outer surface of the fuser member so as to fuse toner to a copy substrate.

Anisotropic filler orientation in the radial and circumferential direction will provide maximum increased thermal conductivity by increasing the amount of heat coming from the internal heating member of the fuser member to the external surface of the fuser member. Therefore, the heat will conduct more efficiently in the radial direction of the fuser member. The result will be a decrease in the core temperature for an equivalent amount of heat. More specifically Q(the amount of heat)=K (thermal conductivity)×A (circumferential area)×ΔT (difference between the core interface and the surface temperature). As the thermal conductivity increases and the same flow of heat and surface temperature are maintained, the core rubber temperature will be decreased. Another result of using an oriented anisotropic filler is that less filler is necessary to increase the thermal conductivity to the desired level. In general, release performance degrades as the content of filler in the outer elastomer layer of the fuser member increases.

In addition, abrasion resistance of the elastomer layer is enhanced. Fuser life is also enhanced by the lowering of the operating temperature made possible by the increase in thermal conductivity in the radial direction.

With the improved process, thermal conductivity in the longitudinal (46 in FIG. 9) direction will not necessarily be increased. However, with fuser rollers, longitudinal conductivity is not necessary due to the fact that the metallic core of the fuser member has sufficient conductivity to longitudinally distribute heat. In the case of a belt fuser, the belt surface comes into contact with a heat shoe as it enters the fusing nip. The heat shoe has sufficient conductivity to uniformly supply heat longitudinally to the entire belt surface.

Fuser member as used herein refers to fuser members including fusing rolls, belts, films, sheets and the like; donor members, including donor rolls, belts, films, sheets and the like; and pressure members, including pressure rolls, belts, films, sheets and the like; and other members useful in the fusing system of an electrostatographic or xerographic, including digital, machine. The fuser member of the present invention may be employed in a wide variety of machines and is not specifically limited in its application to the particular embodiment depicted herein.

The fuser member substrate may be a roll, belt, flat surface, sheet, film, or other suitable shape used in the fixing of thermoplastic toner images to a suitable copy substrate. It may take the form of a fuser member, a pressure member or a release agent donor member, preferably in the form of a cylindrical roll. Typically, the fuser member is made of a hollow cylindrical metal core, such as copper, aluminum, stainless steel, or certain plastic materials chosen to maintain rigidity, structural integrity, as well as being capable of having a polymeric material coated thereon and adhered firmly thereto. It is preferred that the supporting substrate is a cylindrical sleeve. In one embodiment, the core, which may be an aluminum or steel cylinder, is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Examples of suitable outer fusing elastomers include elastomers such as fluoroelastomers. Specifically, suitable fluoroelastomers are those described in detail in U.S. Pat. Nos. 5,166,031; 5,281,506; 5,366,772; 5,370,931; 4,257,699; 5,017,432; and 5,061,965, the disclosures each of which are incorporated by reference herein in their entirety.

These fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E6C®, VITON E430®, VITON 910®, VITON GH® VITON GF®, VITON E45®, VITON A201C®, and VITON B50®. The VITON® designation is a Trademark of E.I. DuPont de Nemours, Inc. Other commercially available materials include FLUOREL 2170®, FLUOREL 2174®, FLUOREL 2176®, FLUOREL 2177®, FLUOREL 2123®, and FLUOREL LVS 76®, FLUOREL® being a Trademark of 3M Company. Additional commercially available materials include AFLAS™ a poly (propylene-tetrafluoroethylene) and FLUOREL II® (LII900) a poly(propylene-tetrafluoroethylenevinylidenefluoride) elastomer both also available from 3M Company, as well as the TECNOFLONS® identified as FOR-60KIR®, FOR-LHF®, NM® FOR-THF®, FOR-TFS®, TH®, TN505® available from Montedison Specialty Chemical Company.

In a preferred embodiment, the fluoroelastomer is one having a relatively low quantity of vinylidenefluoride, such as in VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer. The fluorine content of the VITON GF® is about 70 weight percent by total weight of fluoroelastomer.

In another preferred embodiment, the fluoroelastomer is one having relatively low fluorine content such as VITON A201C which is a copolymer of vinylidene fluoride and hexafluoropropylene, having about 65 weight percent fluorine content. This copolymer is compounded with crosslinkers and phosphonium compounds used as accelerators.

It is preferred that the fluoroelastomer have a relatively high fluorine content of from about 65 to about 71, preferably from about 69 to about 70 weight percent, and particularly preferred about 70 percent fluorine by weight of total fluoroelastomer. Less expensive elastomers such as some containing about 65 weight percent fluorine can be used.

Other suitable fluoroelastomers include fluoroelastomer composite materials which are hybrid polymers comprising at least two distinguishing polymer systems, blocks or monomer segments, one monomer segment (hereinafter referred to as a "first monomer segment") of which possesses a high wear resistance and high toughness, and the other monomer segment (hereinafter referred to as a "second monomer segment") of which possesses low surface energy. The composite materials described herein are hybrid or copolymer compositions comprising substantially uniform, integral, interpenetrating networks of a first monomer segment and a second monomer segment, and in some embodiments, optionally a third grafted segment, wherein both the structure and the composition of the segment networks are substantially uniform when viewed through different slices of the fuser member layer. Interpenetrating network, in embodiments, refers to the addition polymerization matrix where the polymer strands of the first monomer segment and second monomer segment, and optional third grafted segment, are intertwined in one another. A copolymer composition, in embodiments, is comprised of a first monomer segment and second monomer segment, and an optional third grafted segment, wherein the monomer segments are randomly arranged into a long chain molecule. Examples of polymers suitable for use as the first monomer segment or tough monomer segment include such as, for example polyamides, polyimides, polysulfones, and fluoroelastomers. Examples of the low surface energy monomer segments or second monomer segment polymers include polyorganosiloxanes, and include intermediates which form inorganic networks. An intermediate is a precursor to inorganic oxide networks present in polymers described herein. This precursor goes through hydrolysis and condensation followed by the addition reactions to form desired network configurations of, for example, networks of metal oxides such as titanium oxide, silicon oxide, zirconium oxide and the like; networks of metal halides; and networks of metal hydroxides. Examples of intermediates include metal alkoxides, metal halides, metal hydroxides, and a polyorganosiloxane as defined above. The preferred intermediates are alkoxides, and specifically preferred are tetraethoxy orthosilicate for silicon oxide network and titanium isobutoxide for titanium oxide network. In embodiments, a third low surface energy monomer segment is a grafted monomer segment and, in preferred embodiments, is a polyorganosiloxane as described above. In these preferred embodiments, it is particularly preferred that the second monomer segment is an intermediate to a network of metal oxide. Preferred intermediates include tetraethoxy orthosilicate for silicon oxide network and titanium isobutoxide for titanium oxide network.

Examples of suitable polymer composites include volume grafted elastomers, titamers, grafted titamers, ceramers, grafted ceramers, polyamide polyorganosiloxane copolymers, polyimide polyorganosiloxane copolymers, polyester polyorganosiloxane copolymers, polysulfone polyorganosiloxane copolymers, and the like. Titamers and grafted titamers are disclosed in U.S. Pat. No. 5,486,987; ceramers and grafted ceramers are disclosed in U.S. Pat. No. 5,337,129; and volume grafted fluoroelastomers are disclosed in U.S. Pat. No. 5,366,772. In addition, these fluoroelastomer composite materials are disclosed in currently pending Attorney Reference Number D/96244Q3, U.S. patent application Ser. No. 08/841,034. The disclosures of these patents and the application are hereby incorporated by reference in their entirety.

Other elastomers suitable for use herein include silicone rubbers. Suitable silicone rubbers include room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Further examples of silicone materials include Dow Corning SILASTIC® 590 and 591, Sylgard 182, and Dow Corning 806A Resin. Other preferred silicone materials include fluorosilicones such as nonylfluorohexyl and fluorosiloxanes such as DC94003 and Q5-8601, both available from Dow Corning. Silicone conformable coatings such as X3-6765 available from Dow Corning. Other suitable silicone materials include the siloxanes (preferably polydimethylsiloxanes) such as, fluorosilicones, dimethylsilicones, liquid silicone rubbers such as vinyl crosslinked heat curable rubbers or silanol room temperature crosslinked materials, and the like. Suitable silicone rubbers are available also from Wacker Silicones.

It is preferred to add an anisotropic filler to the elastomer layer. Preferably the anisotropic filler is anisotropic dimensionally. Specifically, a dimensionally anisotropic filler has a thickness dramatically smaller than the perimeter of the filler. In other words, the anisotropic filler has a major and a minor axis, and the major axis is larger than the minor axis, but the dimension in the third direction is distinctly smaller than in the other two directions. Either the major axis of the anisotropic filler or the minor axis of the anisotropic filler is substantially parallel to a radius of the fuser member. In another preferred embodiment, the anisotropic filler is elliptical in shape, and in a particularly preferred embodiment, the fillers are platelet shaped.

Preferred anisotropic fillers include graphite, metal oxides such as aluminum oxide, zinc oxide, iron oxide, molybdenum disulfide, and mixtures thereof. Also, in an embodiment, more than one anisotropic filler may be present in the elastomer layer. Preferably, the anisotropic filler is added in a total amount of from about 5 to about 45, preferably from about 10 to about 40, and particularly preferred from about 15 to about 30 volume percent by total volume of the elastomer coating layer.

In an optional embodiment, both the degree of orientation of the fillers and the thermal conductivity can be enhanced by the addition of a fluorocarbon powder or perfluoroether liquids to the elastomer layer, in addition to an anisotropic filler. Examples of fluorocarbon powders include perfluoropolymers such as fluorinated ethylenepropylene copolymer (FEP), polytetrafluoroethylene (PTFE), perfluoroalkoxy copolymers (PFA) for example tetrafluoroethylene perfluoroalkylvinylether copolymers (PFA TEFLON®), tetrafluoroethylene hexafluoropropylene copolymers, tetrafluoroethylene ethylene copolymers, tetrafluoroethylene-hexafluoropropylene-perfluoroalkylvinylether copolymer powders, and mixtures thereof. Preferably, the fluorocarbon powder filler is added in a total amount of from about 1 to about 15 parts, preferably from about 2 to about 10 parts, and particularly preferred of from about 4 to about 7 parts per 100 elastomer. Examples of perfluoroether liquids include KRYTOX® available from DuPont.

In addition, the particle size of the filler compounds, both the anisotropic filler and the fluorocarbon powder, is preferably not too small as to harden the elastomer excessively or negatively affect the strength properties of the elastomer, and not too large be unorientable in the radial direction since the coating is fairly thin. A sufficiently large particle could have a dimension larger than the thickness of the elastomer. Typically, the anisotropic particles have a particle size or mean diameter, as determined by standard methods, of from about 0.01 to about 44 micrometers, preferably about 1 to about 10 micrometers. Typically, the fluorocarbon powder filler particles have a particle size or mean diameter, as determined by standard methods, of from about 3 to about 30 $\mu$m, preferably from about 8 to 15 $\mu$m.

The orientation of the fillers in the elastomer layer has been found to affect the thermal conductivity of the elastomer layer. Specifically, by orienting the fillers in the radial direction, the thermal conductivity has been shown to increase by from about 60 to about 80 percent.

Other adjuvants and fillers may be incorporated in the elastomer in accordance with the present invention provided that they do not affect the integrity of the elastomer material. Such fillers normally encountered in the compounding of elastomers include coloring agents, reinforcing fillers, and processing aids. Oxides such as magnesium oxide and hydroxides such as calcium hydroxide are suitable for use in curing many fluoroelastomers. Other metal oxides such as cupric oxide and/or zinc oxide can be used to improve release.

If the fuser member is in the form of a fuser roller, it is preferred that the elastomer fusing coating layer be coated to a thickness of from about 1.5 to about 3.0 mm. In a pressure roller embodiment, the fuser roll coating thickness range would be 100 to 250 μm and preferred would be 150 to 200 μm. In a fuser belt embodiment, it is preferred that the elastomer coating be coated to a thickness of from about 2 to about 7 mm and preferably from about 3 to about 4 mm.

Preferred polymeric fluid release agents to be used in combination with the elastomer layer are those comprising molecules having functional groups which interact with the anisotropic filler particles in the fuser member and also with the elastomer itself in such a manner to form a layer of fluid release agent which results in an interfacial barrier at the surface of the fuser member while leaving a non-reacted low surface energy release fluid as an outer release film. Suitable release agents include polydimethylsiloxane fusing oils having amino, mercapto, and other functionality for fluoroelastomer compositions. For silicone based compositions, a nonfunctional oil may also be used. The release agent may further comprise non-functional oil as diluent.

Other layers such as adhesive layers or other suitable cushion layers or conductive layers may be incorporated between the outer elastomer layer and the substrate.

Therefore, disclosed herein is a heated fuser member having a combination of elastomer and anisotropic filler, which, in embodiments, decreases the occurrence of toner offset and promotes an increase in the thermal conductivity in order to decrease the temperature necessary to heat the fuser member, or in an alternative embodiment, increases the thermal conductivity wherein heat-up or warm-up time is decreased. The results are an increase in fusing speed. In addition, in embodiments, the fuser member provides for an increased fuser life by increasing wear resistance.

All the patents and applications referred to herein are hereby specifically, and totally incorporated herein by reference in their entirety in the instant specification.

The following Examples further define and describe embodiments of the present invention. Unless otherwise indicated, all parts and percentages are by weight of total solids as defined in the specification.

EXAMPLES

Example 1

Fluoroelastomer Filled with Anisotropic Platy Alumina

Alcan alumina, C71-EFG, obtained from Alcan Chemical, Beechwood, Ohio, was added in an amount of about 59 parts per hundred of VITON® GF (20 vol %) without any fluorocarbon powder and was two-roll milled using known processes. Thermal conductivity samples were prepared in such a manner as to be able to measure the resultant conductivities in the machine direction, the cross machine direction and the direction perpendicular to the machine and cross machine directional plane. The conductivities in units of W/m° K. are shown below in Table 1.

TABLE 1

| Direction | Thermal Conductivity (W/m° K.) |
|---|---|
| Machine direction | 0.417 |
| Cross machine direction | 0.357 |
| Perpendicular to the machine and cross machine plane | 0.238 |

Example 2

Fluoroelastomer Filed with Anisotropic Platy Iron Oxide

MiOX SG iron oxide, obtained from Karntner Montanindustrie of Austria, was added in an amount of about 78 parts per hundred of VITON® GF (20 vol %) without any fluorocarbon powder and was two-roll milled. Thermal conductivity samples were prepared in such a manner as to be able to measure the resultant conductivities in the machine direction, the cross machine direction and the direction perpendicular to the machine and cross machine directional plane. The conductivities in units of W/m° K. are shown below in Table 2.

TABLE 2

| Direction | Thermal Conductivity (W/m° K.) |
|---|---|
| Machine direction | 0.386 |
| Cross machine direction | 0.360 |
| Perpendicular to the machine and cross machine plane | 0.231 |

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

We claim:

1. A method for increasing thermal conductivity of a heated fuser member comprising orienting anisotropic fillers in an elastomer layer in a manner wherein heat transfer is maximized in a radial, tangential or both radial and tangential direction of said fuser member.

2. A method in accordance with claim 1, wherein said anisotropic fillers are oriented in a manner wherein heat transfer is maximized in said radial direction.

3. A method in accordance with claim 1, wherein said anisotropic fillers are oriented in a manner wherein heat transfer is maximized in said tangential direction.

4. A method in accordance with claim 1, wherein said anisotropic fillers are oriented in a manner wherein heat transfer is maximized in said radial direction and in said tangential direction.

5. A method in accordance with claim 1, wherein said anisotropic filler has a major and a minor axis, wherein the major axis of the anisotropic filler is oriented so as to be substantially parallel to a radius of the fuser member.

6. A method in accordance with claim 1, wherein said anisotropic filler is elliptical in shape.

7. A method in accordance with claim 6, wherein said anisotropic filler has a platelet shape.

8. A method in accordance with claim 1, wherein a plane substantially perpendicular to an elongated axis of said fuser member includes said anisotropic fillers.

9. A method in accordance with claim 1, comprising a) roll milling said anisotropic fillers and said elastomer to form a filled elastomer sheet, b) removing said sheet from the roll mill, c) cutting said sheet into strips, and d) forming said strips on said fuser member in a manner so as to orient said anisotropic fillers to maximize heat transfer.

10. A method in accordance with claim 9, wherein said strips are formed on said fuser member by winding said strips in a circumferential direction of said fuser member around an outer periphery of said fuser member in a spiral fashion.

11. A method in accordance with claim 10, wherein said strips are spaced close to one another so that virtually nil spacing is formed between said strips on said fuser member.

12. A method in accordance with claim 10, further comprising heat curing said strips to said fuser member following winding of said strips around said fuser member.

13. A method in accordance with claim 9, further comprising extruding said strips prior to forming said strips on said fuser member.

14. A method in accordance with claim 13, wherein said extruded strips are formed on said fuser member by winding said extruded strips in a circumferential direction of said fuser member around an outer periphery of said fuser member in a spiral fashion.

15. A method in accordance with claim 14, further comprising heat curing said extruded strips to said fuser member following winding of said strips around said fuser member.

16. A method in accordance with claim 1, comprising a) extruding said anisotropic fillers and said elastomer to form an elongated elastomer strip, and b) forming said elongated strip on said fuser member in a manner so as to orient said anisotropic fillers to maximize heat transfer.

17. A method in accordance with claim 16, wherein said elongated strip is formed on said fuser member by winding said elongated strip in a circumferential direction of said fuser member around an outer periphery of said fuser member in a spiral fashion.

18. A method in accordance with claim 17, further comprising heat curing said elongated strip to said fuser member following winding of said elongated strip around said fuser member.

19. A method in accordance with claim 1, wherein said elastomer is selected from the group consisting of silicone elastomers, fluoroelastomers and mixtures thereof.

20. A method in accordance with claim 19, wherein said elastomer is a fluoroelastomer selected from the group consisting of a) copolymers of vinylidenefluoride, hexafluoropropylene and tetrafluoroethylene, b) terpolymers of vinylidenefluoride, hexafluoropropylene and tetrafluoroethylene, and c) tetrapolymers of vinylidenefluoride, hexafluoropropylene, tetrafluoroethylene and a cure site monomer.

21. A method in accordance with claim 19, wherein said fluoroelastomer comprises about 35 weight percent of vinylidenefluoride, about 34 weight percent of hexafluoropropylene, about 29 weight percent of tetrafluoroethylene and about 2 weight percent of a cure site monomer.

22. A method in accordance with claim 19, wherein said fluoroelastomer has a fluorine content of from about 65 to about 71 weight percent fluorine by weight of total fluoroelastomer.

23. A method in accordance with claim 22, wherein said fluoroelastomer has a fluorine content of about 70 weight percent fluorine by weight of total fluoroelastomer.

24. A method in accordance with claim 19, wherein said fluoroelastomer is a composite material selected from the group consisting of volume grafted elastomers, titamers, grafted titamers, ceramers, grafted ceramers, polyamide polyorganosiloxane copolymers, polyimide polyorganosiloxane copolymers, polyester polyorganosiloxane copolymers, and polysulfone polyorganosiloxane copolymers.

25. A method in accordance with claim 1, wherein said anisotropic filler is selected from the group consisting of graphite, aluminum oxide, molybdenum disulfide, iron oxide, zinc oxide, and mixtures thereof.

26. A method in accordance with claim 1, wherein said elastomer layer further comprises cupric oxide.

27. A method in accordance with claim 1, wherein said anisotropic filler is present in an amount of from about 5 to about 45 volume percent by total volume of the elastomer layer.

28. A method in accordance with claim 27, wherein said anisotropic filler is present in an amount of from about 15 to about 30 volume percent by total volume of the layer.

29. A method in accordance with claim 1, wherein said elastomer layer further comprises an additional filler selected from the group consisting of fluorocarbon powder, perfluoroether liquids, and mixtures thereof.

30. A method in accordance with claim 29, wherein said fluorocarbon powder is selected from the group consisting of fluorinated ethylenepropylene copolymer, polytetrafluoroethylene, perfluoroalkoxy copolymers, tetrafluoroethylene hexafluoropropylene copolymers, tetrafluoroethylene ethylene copolymers, tetrafluoroethylene hexafluoropropylene perfluoroalkylvinylether copolymers, and mixtures thereof.

31. A method in accordance with claim 29, wherein said fluorocarbon powder is present in said elastomer layer in an amount of from about 1 to about 15 parts per 100 parts elastomer.

32. A fuser member prepared by the method of claim 1.

* * * * *